United States Patent Office 2,900,425
Patented Aug. 18, 1959

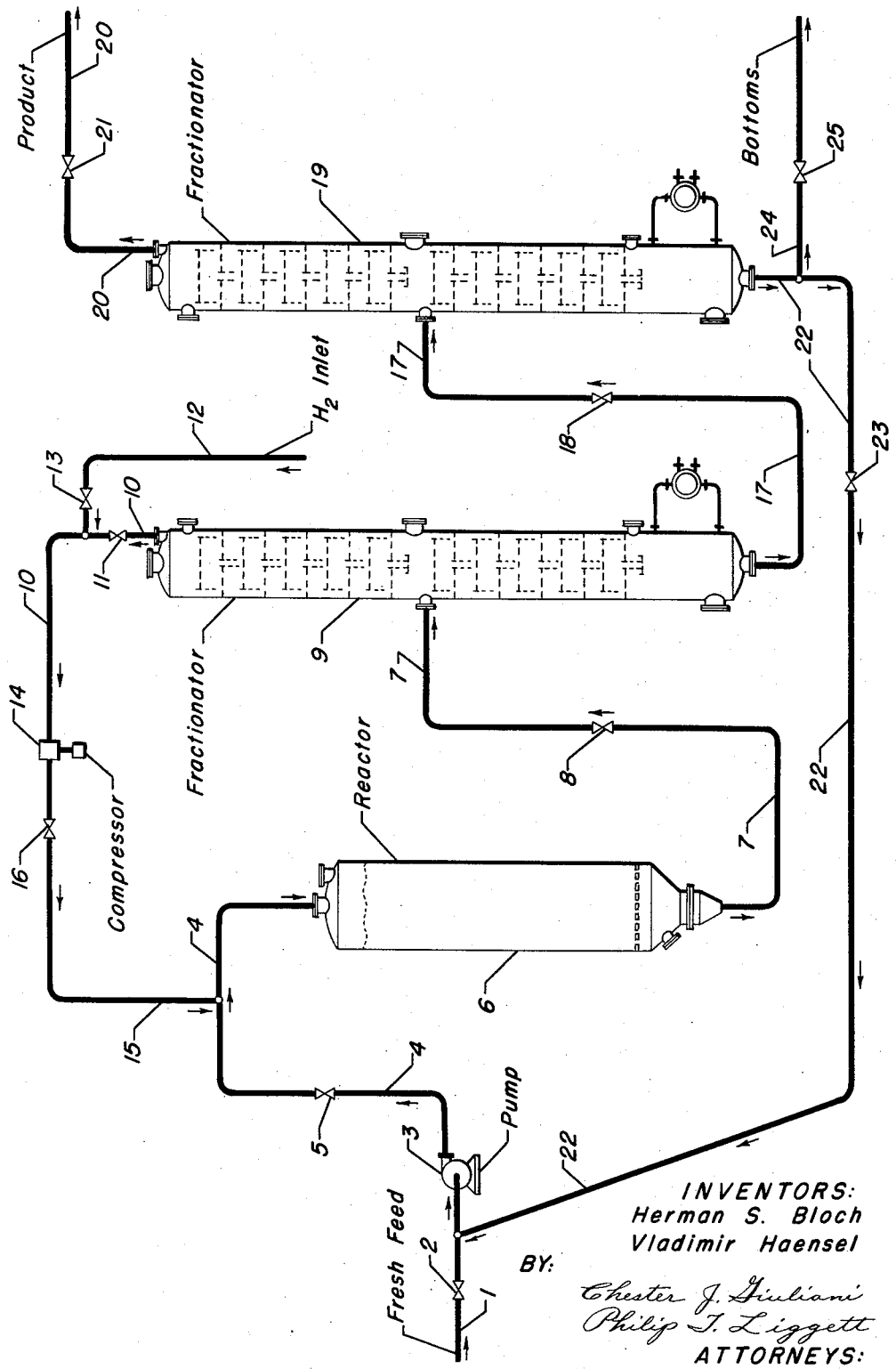

2,900,425

ISOMERIZATION PROCESS

Herman S. Bloch, Skokie, and Vladimir Haensel, Hinsdale, Ill., assignors, by mesne assignments, to Universal Oil Products Company, Des Plaines, Ill., a corporation of Delaware Application August 10, 1956, Serial No. 603,409

12 Claims. (Cl. 260—666)

This application relates to the isomerization of an isomerizable compound and is more particularly related to a novel catalytic composition which can be utilized to effect the desired isomerization.

In recent years with the advances in the automotive industry, fuels of relatively high octane rating have been found necessary. Many methods have been provided for the production of high antiknock fuels. These methods include such processes as alkylation, reforming, catalytic cracking, and high temperature thermal cracking and reforming operations. Other processes which may be considered in a sense auxiliary were developed, for example, isomerization, which was employed to produce isoparaffins which subsequently were reacted with olefins to form a high octane number motor fuel fraction, commonly termed alkylate. In addition to the production of one of the reactants for alkylation, isomerization was also utilized to increase the antiknock quality of saturated hydrocarbons such as paraffins and naphthenes found in selected fractions of gasolines and naphthas. An example of the latter type of operation is a process in which pentane and/or hexane fractions are isomerized to produce isopentane and/or isomeric hexanes which subsequently may be employed as blending agents in automotive and aviation fuels.

In most of the above-mentioned isomerization processes, catalytic agents are employed to effect the desired molecular rearrangement. Ordinarily, these catalytic agents consist of metal halides, such as aluminum chloride, aluminum bromide, etc., which are activated by the addition of the corresponding hydrogen halide. These catalytic materials are initially very active and effect high conversions per pass, however, the activity of these catalysts is so high that the catalysts accelerate decomposition reactions as well as isomerization reactions with the result that the ultimate yield of isomerized product is reduced. The cracking also considerably increases catalyst consumption by reaction of fragmental material with the catalytic agent to form sludge-like material. In spite of what might have been predicted, these decomposition and/or cracking reactions can not be reduced by simply lowering the reaction zone temperature. At temperatures at which satisfactory isomerization reactions are obtained, these reactions are pronounced. We have discovered a catalytic agent which can be more effectively employed for the isomerization of saturated hydrocarbon as well as other types of isomerizable organic compounds. Our catalytic agent consists of a novel composition comprising a refractory oxide, a platinum group metal, and a metal halide of the Friedel-Crafts type. As will be set forth in detail hereinafter the components of this multicomponent catalyst exert a beneficial effect upon one another. For example, a preferred catalyst within the generally broad scope of the present invention comprises alumina, platinum, and aluminum chloride. As one skilled in the art would expect, the alumina is utilized as a support for the other catalyst components. However, the results obtained with the multicomponent catalyst can not be obtained by the utilization of a physical mixture of (1) alumina impregnated with aluminum chloride, and (2) alumina impregnated with platinum.

In one embodiment our invention relates to a process for the isomerization of an isomerizable organic compound which comprises contacting said compound at isomerization conditions with a catalyst comprising a refractory oxide, a platinum group metal, and a metal halide of the Friedel-Crafts type.

In a more specific embodiment our invention relates to a process for the isomerization of an isomerizable saturated hydrocarbon which comprises contacting said hydrocarbon with a catalyst comprising a refractory oxide, platinum, and a metal halide of the Friedel-Crafts type.

In a still further embodiment our invention relates to a process for the isomerization of an isomerizable acyclic paraffin hydrocarbon which comprises contacting said hydrocarbon at isomerization conditions with a catalyst comprising alumina, platinum, and aluminum chloride.

In a specific embodiment our invention relates to a process for the isomerization of n-butane to isobutane which comprises contacting n-butane at isomerization conditions with a catalyst comprising alumina, platinum, and aluminum chloride.

In another specific embodiment our invention relates to a process for the isomerization of n-pentane to more highly branched chain isomers which comprises contacting n-pentane at isomerization conditions with a catalyst comprising alumina, platinum, and aluminum chloride.

In an additional specific embodiment our invention relates to a process for the isomerization of n-hexane to more highly branched chain isomers which comprises contacting n-hexane at isomerization conditions with a catalyst comprising alumina, platinum, and aluminum chloride.

The process of our invention is especially applicable to the isomerization of isomerizable saturated hydrocarbons including acyclic paraffins and cyclic naphthenes and is particularly suitable for the isomerization of straight chain or mildly branched chain paraffins containing 4 or more carbon atoms per molecule, including n-butane, n-pentane, n-hexane, n-heptane, n-octane, etc.; or cycloparaffins ordinarily containing at least 5 carbon atoms in the ring such as alkylcyclopentanes and cyclohexanes, including methylcyclopentane, dimethylcyclopentane, cyclohexane, methylcyclohexane, dimethylcyclohexanes, etc. It is also applicable to the conversion of mixtures of paraffins and/or naphthenes such as those derived by selective fractionation and distillation of straight run or natural gasolines and naphthas. Such mixtures of paraffins and/or naphthas include so-called pentane fractions, n-hexane fractions, and mixtures thereof. The process of our invention is also suitable for the isomerization of olefins, for example, the isomerization of 1-butene to 2-butene, the isomerization of 3-methyl-1-butene to 2-methyl-2-butene, etc. The process may also be used for the isomerization of alkyl aromatic hydrocarbons, for example, the isomerization of ethylbenzene to dimethylbenzene or xylene, the isomerization of propylbenzene to methyl ethylbenzene or trimethylbenzene, etc.

The catalyst used in the process of the present invention comprises a refractory oxide, a platinum group metal, and a metal halide of the Friedel-Crafts type. The refractory oxide is a solid and may be selected from diverse oxides which are not necessarily equivalent as supports. Among suitable refractory oxides are various substances such as silica (a non-metallic refractory oxide), and various refractory metal oxides such as alumina, titanium dioxide, zirconium dioxide, chromia, zinc oxide, silica-alumina, chromia-alumina, alumina-boria, silica-zirconia, and various naturally occurring refractory oxides of various states of purity such as bauxite, kaolin or clay, which may or may not have been acid treated, diatomaceous earth such as kieselguhr, montmorillonite, spinels, such as magnesium oxide-alumina spinels or zinc oxide spinels, etc. Of the above-mentioned refractory oxides, alumina is preferred, and particularly preferred is synthetically prepared gamma-alumina of a high degree of purity.

In the catalysts used in the process of the present invention, the above-mentioned refractory oxides have composited therewith a platinum group metal and a metal halide of the Friedel-Crafts type. By a platinum-group metal is meant a noble metal, excluding silver and gold, and selected from platinum, palladium, ruthenium, rhodium, osmium, and iridium. These metals are not necessarily equivalent in activity in the catalysts utilized in the process of the present invention and of these metals platinum and palladium are preferred, and particularly platinum is preferred. With the solid composite of refractory oxide and a platinum-group metal for use as a catalyst in the process of the present invention is associated a metal halide of the Friedel-Crafts type. Suitable metal halides of the Friedel-Crafts type include aluminum chloride, aluminum bromide, ferric chloride, ferric bromide, zinc chloride, berryllium chloride, gallium chloride, titanium tetrachloride, zirconium chloride, stannic chloride, etc. Of these metal halides of the Friedel-Crafts type, the aluminum halides are preferred, and of the aluminum halides, aluminum chloride is particularly preferred. Furthermore, these metal halides are not necessarily equivalent when utilized in forming the catalysts utilized in the present process.

The preferred catalyst composition comprises alumina, platinum, and aluminum chloride. As stated hereinabove, the alumina is preferably synthetically prepared gamma alumina and of a high degree of purity. The methods of preparation of such synthetically gamma aluminas are well known. For example, they may be prepared by calcination of alumina gels which are commonly formed by adding a suitable reagent, such as ammonium hydroxide, ammonium carbonate, etc, to a salt of aluminum, such as aluminum chloride, aluminum sulfate, aluminum nitrate, etc., in an amount to form aluminum hydroxide which upon drying and calcination is converted to gamma alumina. It has been found that aluminum chloride is generally preferred as the aluminum salt, not only for convenience in subsequent washing and filtering procedures, but also because it appears to give the best results. Alumina gels may also be prepared by the reaction of sodium aluminate with a suitable acidic reagent to cause precipitation thereof with the resultant formation of aluminum hydroxide gel. Synthetic aluminas may also be prepared by the formation of alumina sols, for example by the reaction of metallic aluminum with hydrochloric acid, which sols can be gelled with suitable precipitation agents such as ammonium hydroxide, followed by drying and calcination. In one embodiment these synthetically prepared aluminas may contain from about 0.01 to about 8% combined halogen based on the weight of the dry alumina, the combined halogen preferably being fluorine. These halogenated aluminas may be prepared in various manners, for example, by the addition of a suitable quantity of hydrofluoric acid to alumina gel prior to drying and calcination thereof. In another manner, aluminum fluoride can be added to alumina gels thus yielding an alumina having the desired quantity of fluorine combined therewith. When the synthetically prepared alumina is prepared from aluminum chloride, it is sometimes advantageous or desirable to minimize the washings thereof to retain a desired amount of chlorine composited with the alumina. In any of the above instances wherein the alumina is prepared from an alumina sol or an alumina gel, the resultant product is calcined to a sufficient temperature to convert the product into gamma alumina. While such resultant aluminas may contain relatively small amounts of water of hydration, gamma alumina with or without combined halogen is the preferred synthetically prepared alumina for use as the refractory oxide component of the preferred catalyst.

The preferred synthetically prepared alumina, as hereinbefore set forth, then has a platinum group metal combined therewith. This platinum group metal, particularly platinum, may be composited with the alumina in any of the many well known methods. For example, an ammoniacal solution of chloroplatinic acid may be admixed with alumina followed by drying and reduction. In another method, chloroplatinic acid in the desired quantity can be added to an alumina gel slurry followed by precipitation of the platinum therefrom on the alumina by means of hydrogen sulfide or other sulfiding agents. In still another method, the platinum can be coprecipitated with the alumina gel, for example, by introduction of a suitable platinum compound into an alumina sol followed by the addition of a precipitation agent. While the quantity of platinum compounded with the alumina is not critical, for economic reasons, the amount of platinum is usually kept at a minimum. Thus, large amounts of platinum do not cause a detrimental effect. However, it is generally preferred to utilize from about 0.01 to about 2% by weight of platinum based on the dry alumina.

While the form of the platinum-group-metal-refractory oxide composite is not critical, it is generally preferred to utilize reasonable size particles so that the total composite may be utilized as a fixed bed in a reaction zone. Thus it is desirable to form the synthetically prepared alumina either before or after the platinum is composited therewith into pellets, for example, of $\frac{1}{16}$ inch by $\frac{1}{16}$ inch, or $\frac{1}{8}$ inch by $\frac{1}{8}$ inch, etc. Alternatively the particles may be in the form of spheres or irregularly shaped particles, such as result from extrusion. While it is not meant to limit the invention to particles of any particular size, the above-mentioned alumina-platinum composites are definitely preferred. These composites of platinum-group metals and refractory oxides, for example, platinum and alumina, are usually somewhat hygroscopic and it is usually necessary to store them in or under an atmosphere of reduced humidity. However, when the metal halide of the Friedel-Crafts type such as aluminum chloride is composited therewith immediately after preparation, drying, and calcination no such precaution is necessary.

The synthetically prepared alumina-platinum composites are preferably impregnated with aluminum chloride to form the desired catalysts for use in the process of the present invention. This can be accomplished readily by sublimation of the aluminum chloride onto the surface of the particles of platinum-alumina composite. Aluminum chloride sublimes at about 183° C. and thus a suitable impregnation temperature will range from about 190° C. to about 350° C. This sublimation can be carried out under pressure if desired, and also in the presence of diluents such as inert gases including paraffin hydrocarbons, and in either liquid or vapor phase. In another embodiment, the platinum-alumina composite can be placed in a reaction zone for this isomerization process and aluminum chloride is sublimed thereon by means of an inert carrier gas or inert carrier liquid. For example, n-butane can be passed through a bed of aluminum chloride maintained at a temperature for sublimation thereof and the n-butane after contact therewith either in vapor or liquid phase along with the thus carried or dissolved aluminum chloride can be directed through the reaction zone for the purpose of preparation of the desired catalyst composite in situ. When the above-indicated sublimation is carried out at atmospheric pressure, the temperature is generally kept in the lower portion of the above-indicated temperature range since the aluminum chloride impregnated on the refractory oxide and platinum group metal exerts its own vapor pressure and will therefore tend to reach a maximum concentration at that temperature. The amount of metal halide of the Friedel-Crafts type utilized in preparing these catalysts will range from about 2.0 to about 25% by weight based upon the weight of the refractory oxide-platinum group metal prior to impregnation. Some hydrogen chloride evolution is noticed upon impregnation of such a composite with aluminum chloride. This evolution is thought to be due to the reaction of aluminum chloride with residual hydroxyl groups on the alumina surface. Thus the first portion of the aluminum chloride impregnated thereon may actually be in the chemical form of oxy-aluminum dichloride. Regardless of whether or not this is so, the catalyst comprises aluminum chloride adsorbed on the surface thereof, and as hereinbefore set forth, it is the particular association of these components which results in the unusual catalytic properties of this catalyst. One unusual feature of these catalysts is that they may be utilized as catalysts for isomerization reactions for which it has ordinarily been considered necessary to utilize hydrogen halide promoters therewith. While the use of hydrogen halide promoters with the catalyst compositions of the present invention is not meant to be excluded thereby, it has usually been found unnecessary to utilize them to obtain satisfactory results with these compositions. In addition to hydrogen halide promoters other materials well known to promote isomerization reactions of saturated hydrocarbons include olefins, secondary or tertiary alkyl halides, oxygen or bromine, water, etc. As stated hereinabove in reference to the utilization of hydrogen halide promoter, it has been found that the present catalyst gives satisfactory results in the absence of such stated materials. However, they may be utilized where desirable, and no intention is meant to exclude the use thereof along with the present catalyst. Compounds such as aromatic hydrocarbons and naphthenic hydrocarbons have been shown in the prior art to be cracking suppressors for the isomerization of saturated hydrocarbon reactions. Side reactions such as cracking encountered in the present process with the hereinabove described catalysts are minimized, and thus the use of such cracking suppressors has not been found to be necessary. However they may be utilized in substantially the same manners as are well known in the prior art.

The process of this invention is directed towards the isomerization of an isomerizable compound. This isomerization is preferably effected in hydrogen atmosphere. While the use of hydrogen in processes of this general type as a cracking suppressor has been previously disclosed, it is felt that the hydrogen pressure or partial pressure is an important variable in the process of this invention. Sufficient hydrogen should be utilized so that the hydrogen to hydrocarbon ratio of the reaction zone feed will be within the molar range of from about 0.25 to about 10. When smaller quantities of hydrogen are utilized, the catalyst rapidly deactivates and cracking reactions become prominent. The use of too much hydrogen is detrimental since the isomerization reaction can be stopped completely by such means. The hydrogen may be supplied from any convenient source and will generally be recycled within the process so that hydrogen consumption will be for all practical purposes negligible. The hydrogen utilized may be purified or may be diluted with various inert materials such as nitrogen, methane, ethane, and/or propane. Also, small amounts of sulfur in the feed stocks may be tolerated without harmful effects on the present catalyst.

As hereinbefore set forth the catalyst utilized in the process of this invention has high isomerization activity with minimum cracking activity and is capable of isomerizing hydrocarbons at milder conditions than those employed with conventional noble metal containing catalysts. Processes have recently been proposed for the isomerization of pentane and/or hexane utilizing such noble metal containing catalysts. These processes are all carried out at relatively high temperatures and are extremely temperature sensitive. In contradistinction, the processes for the isomerization of a saturated hydrocarbon utilizing Friedel-Crafts type metal halide catalysts promoted by hydrogen halides have been proposed for operation at relatively low temperatures, as from about 50° C. to about 150° C. Decomposition reactions in such processes, as hereinbefore set forth, are very pronounced and catalyst consumption and life is low. While the catalyst utilized in the process of the present invention requires somewhat higher temperatures, the economic balance between the additional heat requirement and catalyst life is very favorable for the present process.

The operating conditions to be employed will depend upon the particular compound being isomerized and generally will be at temperatures ranging from about 100° C. to about 300° C. although temperatures within the more limited range of from about 150° C. to about 275° C. will generally be utilized. The pressure utilized will range from about 50 lbs. per square inch to about 1500 lbs. per square inch. As hereinabove set forth, the process of the present invention utilizing the above-described catalyst is particularly adapted for a so-called fixed bed type process. In such a process, the compound or compounds to be isomerized are passed in either an upward or downward flow over the catalyst along with hydrogen. The reaction products are then separated from the hydrogen, which is recycled, and subjected to fractionation and separation of the desired reaction products. Recovered starting material is recycled so that the overall process yield is high. In such processes the hourly liquid space velocities which are defined as the volume of reactants per unit time per volume of the catalyst will be maintained within the general range of from about 0.25 to about 10 and preferably within the range of from about 0.5 to about 5. Another means of effecting the isomerization reaction of the present invention is to employ a fluidized fixed bed of catalyst wherein the reactant or reactants are passed upwardly through a bed of the catalytic material at a sufficient rate to maintain the individual particles of catalyst in a state of hindered settling. However, the rate of passage of reactant through the bed is not so great as to suspend the catalytic material in the stream of isomerizable compound and carry it out of the reaction zone. As is readily apparent smaller size particles than hereinabove described are more suitable for such a modified operation. If desired, the catalyst will be utilized in the form of so-called microparticles and the process may be effected in a two-zone fluidized transfer process. In such a process when it is desired to regenerate the catalyst or to reactivate it by other means, the catalytic material may be suspended in a gas stream and conveyed to a second zone wherein it is contacted with reactivating material such as additional metal halide of the Friedel-Crafts type, after which the reactivated catalyts is returned to the reaction zone wherein it may be utilized to effect further reactions. Another suitable two-zone system may be the use of a moving bed wherein a dense bed of catalytic material slowly descends through the reaction zone, is discharged from the lower portion thereof into a reactivation zone from which it is transported again to the top of the fixed bed in the reaction zone to again descend through the zone effecting further reactions in transit. Regardless of the particular operation employed, the products are fractionated or otherwise separated to recover the desired product and to separate unconverted material which may be recycled. Hydrogen in the effluent product likewise is separated and preferably is recycled. Should catalyst activators such as hydrogen halides be utilized they will also be separated and recycled in a like manner.

The following is a brief description of one method of conducting the operation employing a fixed bed of the preferred catalyst, that is alumina, platinum, and aluminum chloride. Referring to the drawing the fresh feed comprising either a single isomerizable paraffinic hydrocarbon, for example, n-butane, or a mixture of isomerizable paraffinic hydrocarbons, as a mixture of pentanes and hexanes high in straight chain configuration compounds, is introduced in line 1 containing valve 2 and is passed into pump 3 which discharges through line 4, valve 5, and into reactor 6. The catalyst placed within reactor 6 will be regularly shaped particles such as pellets, spheres, or other shapes formed by extrusion, pelleting, etc. The catalytic agent, as hereinbefore stated, is a multiple component catalyst. The operating conditions maintained in reactor 6 are a temperature of 200° C., pressure of 300 lbs. per square inch, and a liquid hourly space velocity of about 1.5.

Hydrogen is introduced into the system through line 12 containing valve 13 and is passed into line 10 on the suction side of compressor 14 which discharges through line 15 containing valve 16 into line 4 through which it is directed into reactor 6. The quantity of hydrogen is regulated so that the hydrogen to hydrocarbon ratio is 1.0.

Reaction products consisting of isomerized hydrocarbons, unconverted hydrocarbons, and hydrogen are withdrawn from reactor 6 through line 7 containing valve 8 and are directed into separator or fractionator 9 wherein the hydrogen is separated from the higher boiling constituents and recycled to the reactor through line 10 as previously described. In many cases it has been found that fractionator 9 can be dispensed with and a simple separator employed if the reactor effluent passing through line 7 is cooled to condense the normally liquid hydrocarbons. In such a case, the hydrogen separates as a gas from the liquid hydrocarbons and may be recycled as hereinabove described. The hydrogen-free material is withdrawn from the bottom of fractionator 9 through line 17 containing valve 18 and is passed into fractionator 19 wherein the desired product is separated from the unconverted material and recovered overhead through line 20 containing valve 21. The unconverted material is withdrawn through line 22 and is recycled to line 1 from where it passes into reactor 6. In order to avoid build up of higher boiling components in the system, a bleed line has been provided on the bottom withdrawal of fractionator 19 from which a minor proportion of the bottoms can be withdrawn from the system through line 24 containing valve 25 into a suitable fractionation equipment (not shown) in which the unconverted charge is separated overhead and returned to the reactor.

The following examples are introduced to illustrate further the novelty and utility of the process of the present invention but with no intention of unduly limiting the same. These examples were carried out in bench scale apparatus. The reactor used consisted of a stainless steel tube of about 1 inch inside diameter about 50 inches long (with a ¼ inch outside diameter thermowell) placed in an electrically heated aluminum bronze block furnace. The upper section of the reactor contained a spirally grooved stainless steel preheat section while the space below the catalyst bed was filled with stainless steel spacers. The hydrocarbon was fed to the reactor using a plunger type charge pump at rates of 50 ml. per hour. The hydrogen charged to the reactor was from a high pressure hydrogen cylinder. The reaction products were condensed, cooled to room temperature, and a phase separation was effected in a high pressure receiver. The liquid product was collected, stabilized to remove low boiling hydrocarbons, and the desired boiling range reaction products analyzed by vapor phase chromatography or by infrared spectrographic techniques.

EXAMPLE I

This example illustrates an attempted isomerization of n-butane utilizing a platinum-alumina composite which did not have aluminum chloride impregnated thereon. A platinum-alumina composite was prepared by the general method of dissolving aluminum pellets in hydrochloric acid to form a sol containing about 15% aluminum. Hydrofluoric acid was added to the sol so that the final composite contains 0.35% fluorine based on the weight of the dry alumina. The resulting solution was mixed with hexamethylene tetraamine in a continuous mixer and dropped into an oil bath at about 90° C. to form spheres. The spheres were aged in the oil, and then in an aqueous solution of ammonia. The washed spheres were then transferred to a dryer, dried at about 250° C., and calcined at about 600° C. The synthetically prepared alumina spheres were impregnated with a dilute ammoniacal solution of chloroplatinic acid. The amount of platinum in this solution was adjusted so that the final composite contained 0.375% platinum by weight based on dry alumina. The thus impregnated composite was calcined in air at a temperature of about 500° C. A sufficient quantity of this alumina was prepared so that it could be used in the preparation of various hereinafter described composites.

A 50 cc. quantity of the above prepared composite was placed as a fixed bed in a reaction tube and tested for activity for the isomerization of n-butane to isobutane. Conditions utilized included a pressure of 300 p.s.i.g., a hydrogen to hydrocarbon ratio of 0.5, hourly liquid space velocity of 1.0, and various temperatures. This composite is virtually inactive for the isomerization of n-butane to isobutane during individual two hour test periods at temperatures of 150° C., 200° C., 250° C., 300° C., and 350° C. At about 400° C., about 1.5% isobutane appears in the product. Temperatures must be raised to about 470° C. before equilibrium quantities of isobutane are observed in the product. The reaction is exceedingly temperature sensitive with side reactions including cracking and disproportionation taking over very rapidly within about a 10° C. temperature spread.

EXAMPLE II

This example illustrates the beneficial effect of impregnating the above platinum-alumina composite with aluminum chloride prior to the utilization thereof as a catalyst for the isomerization of n-butane. Seventy grams of platinum-alumina composite prepared as hereinabove described was reduced with hydrogen for two hours at 600° C. and then was placed in a glass liner in a rotating autoclave along with 52 grams of anhydrous aluminum chloride. The autoclave was sealed, pressured with 25 lbs. of hydrogen, and heated and rotated for two hours at 250° C. The autoclave was allowed to cool overnight, opened, and the final composite recovered therefrom. Weighing of this composite indicated that it had gained in weight equivalent in weight to 18.5% aluminum chloride impregnated thereon. Samples of the above prepared catalyst were utilized for the isomerization of n-butane and for isomerization of n-pentane, and n-hexane. The results obtained with n-butane are summarized in the following table:

Table I

ISOMERIZATION OF n-BUTANE IN THE PRESENCE OF 19% ALUMINUM CHLORIDE, 0.375% PLATINUM, AND ALUMINA

| Run No. | 1 | 2 | 3 | 4 | 5 | 6 |
| --- | --- | --- | --- | --- | --- | --- |
| Pressure, p.s.i.g | 300 | 300 | 300 | 300 | 300 | 300 |
| LHSV | 1.0 | 1.0 | 1.0 | 1.0 | 1.0 | 1.0 |
| Hydrogen to hydrocarbon ratio | 0.5 | 0.5 | 0.5 | 0.5 | 0.5 | 0.5 |
| Temperature, ° C | 126 | 148 | 176 | 200 | 226 | 251 |
| Product, wt. percent: | | | | | | |
| Isobutane | 0.7 | 2.6 | 12.2 | 24.6 | 43.3 | 44.1 |
| n-Butane | 94.0 | 96.0 | 87.0 | 74.6 | 54.2 | 51.1 |
| $C_1$-$C_3$ | 0 | 0 | 0 | 0.4 | 2.8 | 9.6 |

The n-butane utilized for these runs analyzed 98.7% n-butane, 1.0% isobutane, and 0.3% pentane. From these results it is obvious that substantial isomerization of isobutane takes place. This isomerization is achieved in the absence of substantial amounts of side reactions and without the utilization of added hydrogen chloride.

As a matter of fact, the results obtained and set forth in run No. 5 illustrate very favorable conditions in which the n-butane feed stock is isomerized to substantially equilibrium values at this temperature. The equilibrium values at 226° C. are 46% isobutane and 54% n-butane. In contrast to the results described hereinabove in Example I, runs 5 and 6 illustrate that about 10% more isobutane per pass can be obtained at these lower temperatures. Thus considerable heat savings can be realized in the commercial utilization of this process.

EXAMPLE III

Another 50 cc. sample of the alumina-platinum-aluminum chloride composite described in Example II was utilized for the isomerization of n-pentane to isopentane. The results obtained are presented in the following table:

Table II
ISOMERIZATION OF n-PENTANE IN THE PRESENCE OF 19% ALUMINUM CHLORIDE, 0.375% PLATINUM, AND ALUMINA

| Run No. | 7 | 8 | 9 | 10 | 11 | 12 |
| --- | --- | --- | --- | --- | --- | --- |
| Pressure, p.s.i.g | 300 | 300 | 300 | 300 | 300 | 300 |
| LHSV | 1.0 | 1.0 | 1.0 | 1.0 | 1.0 | 1.0 |
| Hydrogen to hydrocarbon ratio | 1.3 | 1.3 | 1.3 | 1.3 | 1.3 | 1.3 |
| Temperature, °C | 125 | 151 | 177 | 199 | 223 | 250 |
| Product, wt. percent: | | | | | | |
| Isopentane | 19.4 | 36.7 | 65.4 | 58.7 | 50.5 | 34.9 |
| n-Pentane | 75.8 | 62.4 | 30.1 | 28.1 | 22.8 | 16.2 |
| $C_1$-$C_4$ | 4.1 | 0.9 | 2.4 | 9.6 | 18.2 | 37.7 |

The n-pentane utilized for these runs analyzed 99.4% n-pentane and 0.6% 2-methyl butane. From the above results it is obvious that substantial isomerization takes place and that this isomerization approaches equilbrium at relatively low temperature in the absence of substantial amounts of side reactions and without the utilization of added hydrogen chloride. The results obtained in run 9 illustrate very favorable conditions in which the n-pentane feed stock is isomerized to substantially equilibrium values at this temperature, pressure, and space velocity.

EXAMPLE IV

This example illustrates the isomerization of n-pentane in the presence of a catalyst which showed a 9.3% weight increase after sublimation of aluminum chloride thereon. This catalyst was prepared in substantially the same manner as described in Example II. Seventy grams of the base composite prepared as described in Example I was placed in a glass autoclave liner along with 14 grams of anhydrous aluminum chloride. The autoclave was closed, pressured to 25 lbs. with hydrogen, and heated and rotated at 250° C. for a two hour period. The autoclave was allowed to cool overnight following which the composite containing about 9.3% aluminum chloride impregnated thereon was removed therefrom.

A 50 cc. sample of the above described composite was utilized for the isomerization of n-pentane. The results obtained are summarized in the following table:

Table III
ISOMERIZATION OF n-PENTANE IN THE PRESENCE OF 9.3% ALUMINUM CHLORIDE, 0.375% PLATINUM, AND ALUMINA

| Run No. | 13 | 14 | 15 |
| --- | --- | --- | --- |
| Pressure, p.s.i.g | 300 | 300 | 300 |
| LHSV | 1.0 | 1.0 | 1.0 |
| Hydrogen to hydrocarbon ratio | 1.3 | 1.3 | 1.3 |
| Temperature, °C | 200 | 250 | 300 |
| Product, wt. percent: | | | |
| Isopentane | 52.6 | 58.3 | 47.1 |
| n-Pentane | 46.5 | 40.5 | 32.3 |
| $C_1$-$C_4$ | 0.9 | 1.2 | 20.6 |

These results again illustrate an effective isomerization catalyst for use at relatively low temperature. Here again no added hydrogen chloride was utilized. Equilibrium percentages of isopentane in the product were obtained at about 250° C. with negligible side reactions.

EXAMPLE V

Example I illustrates the necessity for the Friedel-Crafts metal halide component of the present catalyst in the isomerization of n-butane. This example was carried out studying the isomerization of n-pentane and illustrates the necessity for the platinum-group component of the catalyst. In this example the support for the aluminum chloride was alumina spheres prepared substantially as described in Example I except that no chloroplatinic acid was composited therewith thus they contained no platinum.

Seventy grams of these platinum-free spheres along with 14 grams of anhydrous aluminum chloride were placed in a glass autoclave liner. The autoclave was sealed, 25 p.s.i.g. of hydrogen added thereto, and the autoclave was heated and rotated for two hours at 250° C. The autoclave was then allowed to stand overnight, and after opening the composite was found to have increased in weight 11.3%, indicating an aluminum chloride pick-up equivalent to the above indicated percentage of 11.3. Fifty cc. of this composite was tested for activity for the isomerization of n-pentane. The results of these tests are summarized in the following table:

Table IV
ISOMERIZATION OF n-PENTANE IN THE PRESENCE OF 11.3% ALUMINUM CHLORIDE ON ALUMINA

| Run No. | 16 | 17 | 18 | 19 |
| --- | --- | --- | --- | --- |
| Pressure, p.s.i.g | 300 | 300 | 300 | 300 |
| LHSV | 1.0 | 1.0 | 1.0 | 1.0 |
| Hydrogen to hydrocarbon ratio | 1.3 | 1.3 | 1.3 | 1.3 |
| Temperature, °C | 150 | 200 | 250 | 300 |
| Product, wt. percent: | | | | |
| Isopentane | 0 | 4.7 | 15.0 | 10.9 |
| n-Pentane | 0 | 93.5 | 82.6 | 86.7 |
| $C_1$-$C_4$ | 0 | 1.8 | 2.4 | 2.4 |

These results can be compared with those described hereinabove in Example IV and illustrate the beneficial effect of the platinum component. The isomerization process is much more satisfactory when carried out in the presence of the novel catalyst composition of this invention. While the catalyst described in this example may be active at higher temperatures and/or in the presence of added hydrogen chloride, the results obtained are certainly not equivalent to those for a similar catalyst containing platinum and described hereinabove.

EXAMPLE VI

This example illustrates the isomerization of n-hexane in the presence of a platinum-aluminum chloride-alumina catalyst. In this example the same sample of catalyst was utilized as that described in Example III for the isomerization of n-pentane. The conditions utilized and results obtained are summarized in the folowing table:

Table V
ISOMERIZATION OF n-HEXANE IN THE PRESENCE OF 19% ALUMINUM CHLORIDE, 0.375% PLATINUM, AND ALUMINA

| Run No. | 20 | 21 | 22 | 23 | 24 | 25 |
| --- | --- | --- | --- | --- | --- | --- |
| Pressure, p.s.i.g | 300 | 300 | 300 | 300 | 300 | 300 |
| LHSV | 1.0 | 1.0 | 1.0 | 1.0 | 1.0 | 1.0 |
| Hydrogen to hydrocarbon ratio | 3.0 | 3.0 | 3.0 | 3.0 | 3.0 | 3.0 |
| Temperature, °C | 125 | 150 | 174 | 199 | 224 | 252 |
| Product, wt. percent: | | | | | | |
| Methylpentanes and dimethylbutanes | 22.0 | 30.2 | 54.5 | 62.9 | 60.1 | 27.2 |
| n-Hexane | 74.3 | 66.4 | 41.0 | 32.7 | 33.6 | 65.9 |
| $C_1$-$C_5$ | 2.3 | 1.8 | 1.2 | 2.7 | 4.9 | 4.8 |

The n-hexane utilized in these experiments analyzed as 96.5% n-hexane, 0.3% 3-methyl pentane, 3.2% methylcyclopentane, and contained 0.03% sulfur by weight. It will be noted that the percent isomerization appears to go through a maximum at about 200–225° C. Although the quantities of isomers obtained do not reach equilibrium within this temperature range, this is due to the slower reactions involving the formation of 2,2- and 2,3-dimethyl butanes.

We claim as our invention:

1. A process for the isomerization of an isomerizable saturated hydrocarbon which comprises contacting said hydrocarbon at an isomerization temperature with a catalyst comprising calcined alumina, a platinum group metal, and a Friedel-Crafts metal halide in which the halogen is selected from the group consisting of chlorine and bromine, said calcined alumina containing hydroxyl groups reactable with at least a portion of said metal halide, said catalyst having been prepared by compositing the platinum group metal with the alumina, drying the resultant composite and subsequently impregnating the dried composite with said metal halide in anhydrous form under conditions to react said hydroxyl groups and at least a portion of said metal halide with evolution of hydrogen halide.

2. The process of claim 1 further characterized in that said hydrocarbon is an acyclic paraffin.

3. The process of claim 1 further characterized in that said hydrocarbon is a cyclic paraffin.

4. A process for the isomerization of an isomerizable saturated hydrocarbon which comprises contacting said hydrocarbon at an isomerization temperature with a catalyst comprising calcined alumina, platinum and a Friedel-Crafts metal halide in which the halogen is selected from the group consisting of chlorine and bromine, said calcined alumina containing hydroxyl groups reactable with at least a portion of said metal halide, said catalyst having been prepared by compositing the platinum with the alumina, drying the resultant composite and subsequently impregnating the dried composite with said metal halide in anhydrous form under conditions to react said hydroxyl groups and at least a portion of said metal halide with evolution of hydrogen halide.

5. A process for the isomerization of an isomerizable acyclic paraffin hydrocarbon which comprises contacting said hydrocarbon at an isomerization temperature with a catalyst comprising calcined alumina, platinum and a Friedel-Crafts metal halide in which the halogen is selected from the group consisting of chlorine and bromine, said calcined alumina containing hydroxyl groups reactable with at least a portion of said metal halide, said catalyst having been prepared by compositing the platinum with the alumina, drying the resultant composite and subsequently impregnating the dried composite with said metal halide in anhydrous form under conditions to react said hydroxyl groups and at least a portion of said metal halide with evolution of hydrogen halide.

6. A process for the isomerization of an isomerizable saturated hydrocarbon which comprises contacting said hydrocarbon at an isomerization temperature with a catalyst comprising calcined alumina, platinum and aluminum chloride, said calcined alumina containing hydroxyl groups reactable with aluminum chloride, said catalyst having been prepared by commingling a solution of a platinum compound with the alumina, drying the resultant composite and subsequently impregnating the dried composite with aluminum chloride in anhydrous form under conditions to react said hydroxyl groups and at least a portion of said aluminum chloride with evolution of hydrogen chloride.

7. The process of claim 6 further characterized in that said hydrocarbon is n-butane.

8. The process of claim 6 further characterized in that said hydrocarbon is n-pentane.

9. The process of claim 6 further characterized in that said hydrocarbon is n-hexane.

10. A process for the isomerization of an isomerizable saturated hydrocarbon which comprises contacting said hydrocarbon at an isomerization temperature with a catalyst comprising calcined alumina, platinum and aluminum chloride, said calcined alumina containing hydroxyl groups reactable with aluminum chloride, said catalyst having been prepared by impregnating the alumina with a chloroplatinic acid solution, drying the resultant composite and subsequently subliming anhydrous aluminum chloride onto the dried composite under conditions to react said hydroxyl groups and at least a portion of said aluminum chloride with evolution of hydrogen chloride.

11. A process for the isomerization of an isomerizable saturated hydrocarbon which comprises contacting said hydrocarbon at an isomerization temperature with a substantially anhydrous catalyst comprising calcined alumina, a platinum group metal, and a Friedel-Crafts metal halide in which the halogen is selected from the group consisting of chlorine and bromine, said calcined alumina containing hydroxyl groups reactable with at least a portion of said metal halide, said catalyst having been prepared by forming a dry composite of the platinum group metal with the alumina and impregnating the dry composite with said metal halide in anhydrous form under conditions to react said hydroxyl groups and at least a portion of said metal halide with evolution of hydrogen halide.

12. The process of claim 11 further characterized in that said refractory oxide is gamma alumina.

References Cited in the file of this patent

UNITED STATES PATENTS

| | | |
|---|---|---|
| 2,550,531 | Ciapetta | Apr. 24, 1951 |
| 2,733,219 | Bloch | Jan. 31, 1956 |
| 2,762,781 | Nozaki et al. | Sept. 11, 1956 |
| 2,781,298 | Haensel et al. | Feb. 12, 1957 |
| 2,798,105 | Heinemann et al. | July 2, 1957 |
| 2,834,823 | Patton et al. | May 13, 1958 |